US005544708A

United States Patent [19]

Braun

[11] Patent Number: 5,544,708
[45] Date of Patent: Aug. 13, 1996

[54] HITCH APPARATUS FOR TRACTOR LIFT ARMS

[76] Inventor: Kenneth L. Braun, 8110 Wayne Trace, Fort Wayne, Ind. 46816

[21] Appl. No.: 368,869

[22] Filed: Jan. 5, 1995

[51] Int. Cl.⁶ .............................. A01B 63/10; B60D 1/10
[52] U.S. Cl. .................................... 172/272; 172/450
[58] Field of Search ............................ 172/272, 439, 172/443, 446, 447, 448, 449, 450, 455; 280/456 A, 460 A, 461 A, 479 A

[56] References Cited

U.S. PATENT DOCUMENTS

| | | |
|---|---|---|
| 2,727,756 | 12/1955 | Van Carlile . |
| 2,775,180 | 12/1956 | Du Shane . |
| 2,910,307 | 10/1959 | Jennings, Jr. . |
| 3,090,639 | 5/1963 | Virtue et al. ................. 172/450 X |
| 3,310,123 | 3/1967 | Abbott . |
| 3,434,737 | 3/1969 | Bailey et al. . |
| 3,489,431 | 1/1970 | McKeon et al. ................. 172/272 |
| 3,572,759 | 3/1971 | Baugh ................. 172/272 |
| 3,807,769 | 4/1974 | Thompson et al. ............... 172/272 |
| 3,977,698 | 8/1976 | von Allworden ............... 172/272 |
| 4,019,753 | 4/1977 | Kestel ................. 172/272 X |
| 4,062,560 | 12/1977 | Mueller, Jr. et al. ............ 172/272 |
| 4,862,971 | 9/1989 | Azzarello et al. . |
| 4,865,134 | 9/1989 | Rugen et al. . |
| 4,917,406 | 4/1990 | Herchenbach et al. . |
| 5,029,650 | 7/1991 | Smit ................. 172/272 X |

*Primary Examiner*—Terry Lee Melius
*Assistant Examiner*—Robert Pezzuto
*Attorney, Agent, or Firm*—George Pappas

[57] ABSTRACT

A hitch apparatus for use with a pair of tractor lift arms for selectively detachably attaching implements to the tractor. The hitch apparatus includes a pair of hook members that are detachably attached to the lift arms of the tractor. A spreader bar extends between the hook members and functions to both attach the hook members to the lift arms and to retain the hook members apart from one another at a preselected distance. A safety arm is pivotally connected to the hook members and is biased via a spring in a first position over the hook mouth for preventing an implement shaft from exiting the hook, or in a second position whereat the implement mounting shaft can easily be inserted or withdrawn from the hook mouth.

20 Claims, 3 Drawing Sheets

HITCH APPARATUS FOR TRACTOR LIFT ARMS

TECHNICAL FIELD

The device of the present invention generally relates to hitch apparatus for use in conjunction with a pair of tractor lift arms whereby various implements such as mowers, plows, etc., are selectively detachably attached to the lift arms. More specifically, the present invention generally relates to a new and improved hitch apparatus including a pair of hook members that are selectively detachably attached to the tractor lift arms and also including a spreader bar for placing the hook members at a preselected distance apart from each other.

DESCRIPTION OF PRIOR ART

Many different tractors are provided with three-point hitch systems for selectively attaching implements such as mowers, tillers, graters, etc., on the back of the tractors thereof. The three-point hitch systems include a pair of lift arms extending generally backwardly from the tractor and which are adapted to pivot or otherwise move upwardly and downwardly. Typically, a pair of power arms and lifters are provided and are connected to the lift arms in a manner whereby selective movement of the power arms causes the lift arms to be moved up and down.

Each of the lift arms are typically provided with a bore or hole at its outer end furthest from the tractor for selectively receiving the implement mounting pegs. Accordingly, for attachment of an implement, the operator is required to back up the tractor and align and attach the lift arms to the implement by inserting the implement mounting pegs through the lift arm bores. A third upper support arm is also attached between the implement and the tractor thereby causing the attachment of "three points" to the tractor. Thus, by merely now causing the selective lifting of the tractor lift arms, the implement is selectively lifted off and back down to the ground as may be needed.

Unfortunately, three-point tractor hitch systems are substantially difficult to align and hook up to implements. Most often, both the implement and the tractor are substantially heavy and cannot be easily maneuvered in position for correctly aligning the lift arm holes with the implement mounting pegs. Additionally, because implement pegs vary in distance from one another, the lift arms are manufactured for also being freely movable horizontally at their free ends. During interconnection, the lift arms must also be spread apart sufficiently to extend over the implement pegs so that the implement pegs may, thereafter, be inserted in the lift arm bores. As can be appreciated, simultaneously moving the tractor with respect to the implement and retaining the lift arms at a proper distance apart from one another can become quite difficult and is typically a two person job, one to drive the tractor and the other to hold the lift arms apart and in proper position for clearing the implement pegs. However, requiring an individual somewhere behind the tractor and in front of the implement can be dangerous in the event of operator error.

Many different hitch assemblies have been devised in the past to overcome the shortcomings of the above-described three-point hitch systems. For example, various spreader bar and hitch mechanisms are shown in U.S. Pat. Nos. 3,434,737, 3,310,123, 2,775,180, 2,910,307 and 4,917,406. Typically, however, these mechanisms tend to be overly complex and, as a consequence, are costly and burdensome to use.

Accordingly, a need exists for a hitch apparatus for use in conjunction with typical tractor lift arms and which is reliable in strength and operation and which is generally inexpensive to manufacture.

SUMMARY OF THE INVENTION

It is the principal object of the present invention to overcome the above-discussed disadvantages associated with prior hitch apparatus for use in conjunction with tractor lift arms.

The present invention overcomes the disadvantages associated with prior hitch apparatus by providing a pair of hook members, each of which have a mouth for receiving an implement attachment shaft or peg and which are provided with an attachment mechanism for selectively detachably attaching the hook members to respective tractor lift arms.

In one embodiment, the attachment mechanism includes a U-shaped portion made up of a valley flat section and a pair of upright walls extending away from the valley flat section and thereby forming a longitudinal channel. The tractor lift arms are adapted to extend into the channel and to be received between the pair of upright walls. A hole is provided in each of the valley flat sections. The holes are correspondingly aligned with the bores of the lift arms when the lift arms are received within the channels.

A spreader bar is also provided and includes mounting pegs at its ends thereof. The mounting pegs are selectively received through the respective aligned valley flat section holes and lift arm bores and a securement pin is provided and is received through a hole in the spreader bar mounting pegs after the mounting peg has been received through the valley flat section holes and lift arm bores. Thus, the spreader bar mounting peg, in conjunction with the securement pins, securely retain the hook members and attachment mechanism upon the tractor lift arms. Simultaneously, the spreader bar length retains the tractor lift arms and hook members apart from one another at a preselected distance as desired.

The spreader bar is also adapted for selective elongation for increasing and decreasing the length thereof and the distance between the respective hook members which are mounted on the tractor lift arms. In this manner, the hook members can be located a selective distance apart from one another for accommodating the distance between the implement pegs. More specifically, the spreader bar includes an inner tube telescopically received in an outer tube and a plurality of through holes are provided in both the inner and outer tubes. As the inner tube is axially moved within the outer tube, respective holes are caused to be aligned and a pin is provided for selectively placing through such aligned outer tube and inner tube holes. In this fashion, the spreader bar can be lengthened or shortened to desired discreet lengths.

In operation, after the spreader bar has been lengthened or shortened as may be needed for placing the hook members at the desired distance apart from each other, the operator merely backs up to the implement using the tractor, lowers the lift arms for causing the hook members to be located below the implement pegs, backs up further to cause the hook members to be located below the implement pegs, and finally causes the lift arms to move upwardly causing the implement pegs to be received through the mouth and into the hook members.

So as to prevent potential inadvertent exiting of the implement pegs from the hook members, especially while driving over rough terrain or under other similar circumstances, the hook members are also provided with a safety arm which is pivotally attached to the apparatus and which is selectively pivotable in one position over the hook mouth and in a second position away from the hook mouth. A spring is also provided and is connected between the safety arm and the hitch apparatus and biases the safety arm either toward the first position or the second position. Accordingly, when an implement is being attached to the hitch apparatus, the safety arms are merely lifted out of the hook mouth in their second position. After the implement pegs have been received through the hook mouth and into the hook, the safety arms are pivoted into their first position over the hook mouth for preventing the inadvertent exiting of the mounting pegs from the hook members.

In a second embodiment, the attachment mechanisms include a square sleeve that forms a longitudinal square channel and the tractor lift arms extend into the square channels. The square sleeves include a pair of aligned walls and each of the aligned walls are provided with axially aligned holes. The holes are also adapted to be coaxially aligned with the tractor lift arm bores whenever the tractor lift arm ends are received in the channel. In this embodiment, the spreader bar mounting pegs extend through the respective coaxially aligned wall holes and the tractor lift arm bores and a securement pin is again used on the end of the spreader bar mounting pegs.

In yet another embodiment where a spreader bar is not critical or otherwise used, the attachment mechanism is U-shaped including a valley flat section and a pair of upright walls. A mounting peg is provided on the valley flat sections and extends away therefrom. The extending mounting pegs are received through the tractor lift arm bores when the lift arms are received in the channel between the upright walls. A securement pin is again used at the end of each mounting peg.

In one form thereof the present invention is directed to a hitch apparatus for use with a pair of tractor lift arms for selectively detachably attaching implements thereto. The hitch apparatus includes a pair of hook members, each of the hook members having a mouth for receiving an implement attachment shaft. The hook members are provided with an attachment mechanism for selectively detachably attaching each of the hook members to a respective tractor lift arm.

BRIEF DESCRIPTION OF THE DRAWINGS

The above-mentioned and other features and objects of this invention and the manner of obtaining them will become more apparent and the invention itself will be better understood by reference to the following description of embodiments of the invention taken in conjunction with the accompanying drawings wherein.

Corresponding reference characters indicate corresponding parts throughout the several views of the drawings.

The exemplifications set out herein illustrate preferred embodiments of the invention in one form thereof and such exemplifications are not to be construed as limiting the scope of the disclosure or the scope of the invention in any manner.

DETAILED DESCRIPTION OF SPECIFIC EMBODIMENTS

Figure 1:
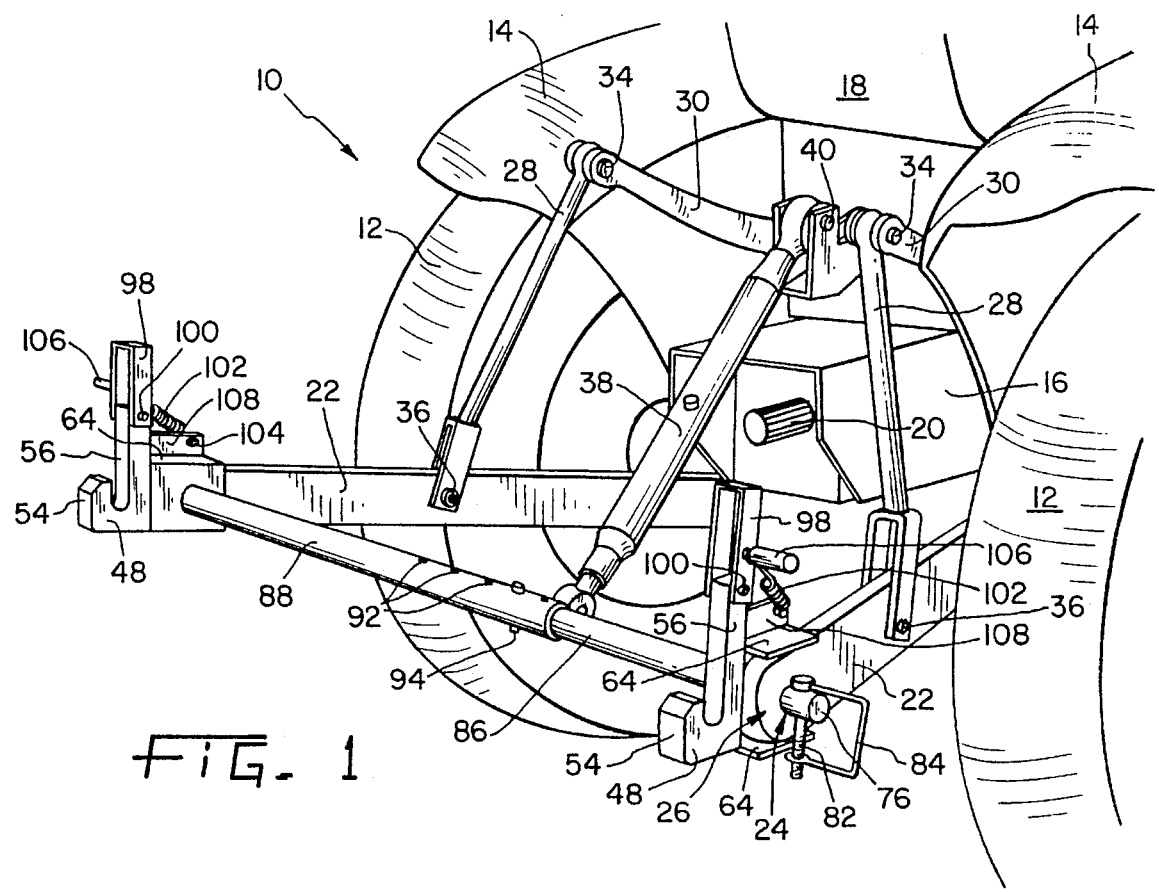
FIG. 1 is a perspective view of the back of a tractor and showing a hitch apparatus according to the present invention mounted thereon.

Referring initially to FIG. 1, a typical back end of a tractor 10 is shown including tires 12, fenders 14, chassis 16, seat 18 and a drive shaft 20 extending from chassis 16. Tractor 10 is provided with a pair of lift arms 22 each of which are generally rectangular in cross section and which are provided with a bore or hole 24 at the lift arm ends 26.

Lift arms 22 are pivotally connected to the tractor chassis 16 at their other end thereof (not shown). Accordingly, lift arms 22 are capable of pivoting upwardly and downwardly in a known and customary manner. It is further noted that lift arms 22 are generally flexible in the horizontal direction and the pivot connection thereof to the chassis (not shown) is constructed in a manner whereby the lift arm ends 26 can also move somewhat in a horizontal plane closer and further away from each other.

Lift arms 22 are supported as shown via links 28 and power arms 30. More specifically, power arms 30 are connected to and are rotatably driven by the power arm rotatable shafts 32. At their other ends thereof, power arms 30 are pivotally connected via pivot pins 34 to links 28. Links 28, in turn, are pivotally connected to lift arms 22 via pivot pins 36. Accordingly, selective rotation of power arm shaft 32 and power arms 30 selectively causes the lift arms 22 to be raised and lowered as desired by the operator.

Figure 2:
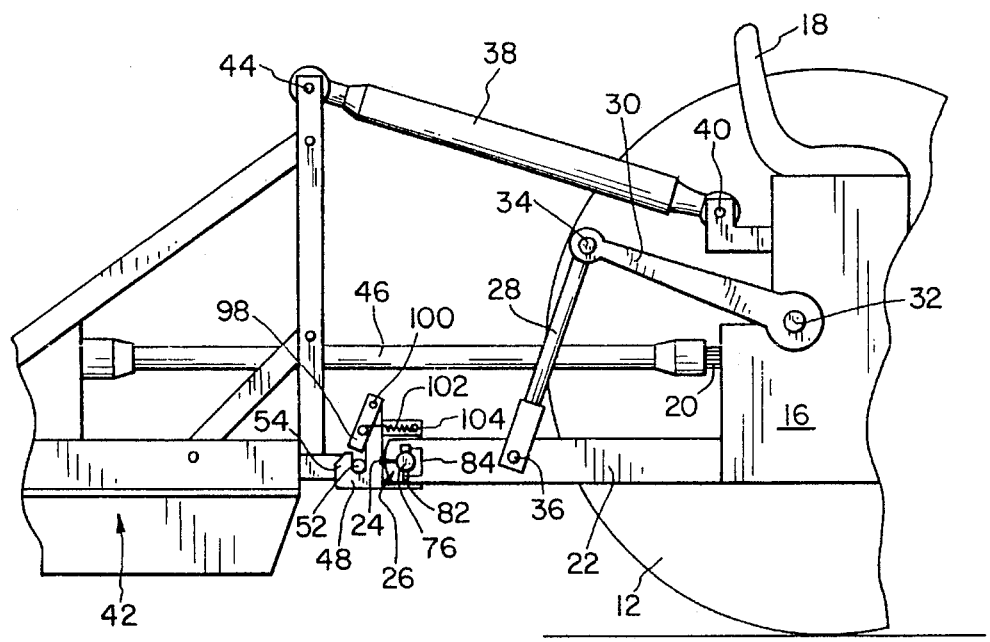
FIG. 2 is a side elevational view of the tractor and hitch apparatus shown in FIG. 1 and further showing an implement being mounted thereon.

Tractor 10 is typically also provided with an upper support arm 38 which is selectively elongated and shortened and which is pivotally connected to the tractor chassis 16 via a pivot pin 40. Upper support arm 38, as shown in FIG. 2, is used in a known and customary manner for attachment to an upper portion of an implement such as mower 42. Typically, upper support arm 38 is also pivotally connected via a pivot pin such as that shown at 44. Additional interconnections can be provided between the tractor 10 and the implement such as mower 42. By way of example, in FIG. 2 a rotatable shaft 46 is provided and is connected between drive shaft 20 and the mower 42 whereby the rotational forces thereof can be transmitted for driving the mower blades (not shown).

A preferred embodiment of the hitch apparatus includes a pair of hook members 48, each of which are provided or have a mouth 50 whereat the implement attachment shafts 52 may be received. Hook members 48 further include a point portion 54 and a neck portion 56. A curvilinear surface 58 is provided between point portion 54 and neck portion 56 whereat the implement attachment shafts 52 are seated. The neck portion 56 of hook member 48 is affixed to a attachment mechanism whereby the hook members 48 are selectively detachably attached to respective lift arms 22.

Figure 4:
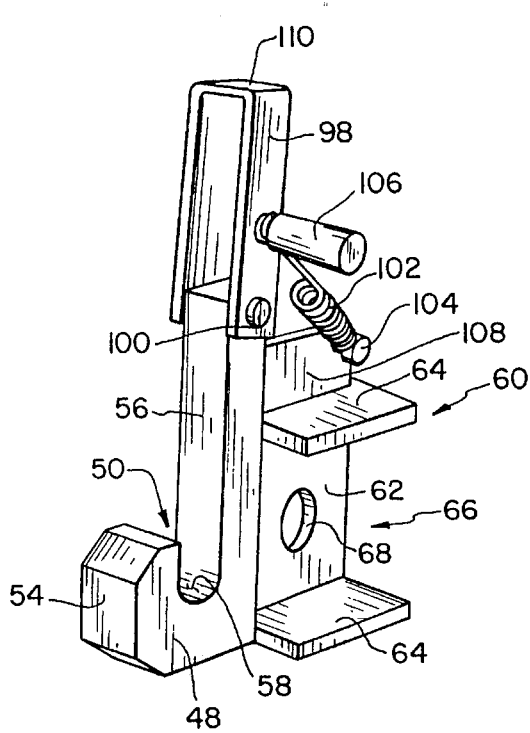
FIG. 4 is a perspective view of a hitch apparatus according to the present invention for use in selective attachment to tractor lift arms.
Figure 5:
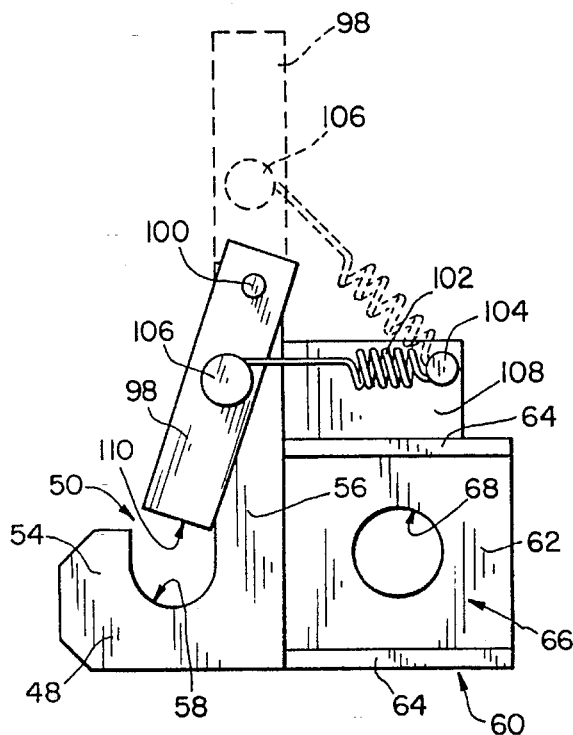
FIG. 5 is a side elevation view of the hitch apparatus shown in FIG. 4 and further showing in dashed and solid lines the pivotal motion of the safety arm and biasing of the spring.

Referring now more specifically to FIGS. 4 and 5, neck portions 56 of hook members 48 are connected to a U-shaped portion 60 including a valley flat planar section or portion 62 and a pair of upright walls 64 extending generally perpendicular from valley flat section 62. Thus, valley flat section 62 and upright walls 64 form a channel 66 wherein the lift arm ends 26 are received as shown in FIGS. 1 and 2. It is noted that upright walls 64 are located apart from one another in a manner whereby each lift arm 22 fits snug therebetween.

The hook and U-shaped portion assemblies shown in FIGS. 4 and 5 fit the right hand lift arm whereas a mirror image thereof is required as shown in FIG. 1 for attachment thereof to the left hand lift arm 22. Additionally, valley flat section 62 and upright walls 64 are preferably welded to neck portion 56 of hook member 48, however, various other means of manufacturing and assembly are contemplated such as, for example, casting or merely cutting from available channel stock.

Each of valley flat sections 62 are further provided with a hole 68 which is strategically located in a manner whereby when the lift arm ends 26 are received within channels 66 the flat section holes 68 are generally coaxially aligned with lift arm bores 24. Thus, for attachment of the hook members 48 to lift arms 22, a spreader bar 70 is provided having a first end 72 and a second end 74 whereat mounting pegs 76 are provided. Mounting pegs 76 extend from annular flats 78 and, as best shown in FIGS. 1 and 2, when spreader bar 70 is placed between each of the hook members 48, mounting pegs 76 extend through respective holes 68 of valley flat sections 62 and through the bores 24 of lift arms 22. As can be appreciated, the valley flat sections 62 are thus sandwiched between the spreader bar annular flats 78 and the lift arm ends 26.

For retaining mounting pegs 76 within holes 68 and bores 24, mounting pegs 76 are provided with holes 80 close to the ends thereof. As shown in FIG. 1, securement pins 82 are selectively received through holes 80 thereby sandwiching both the lift arm 22 and the valley flat section 62 between securement pins 82 and annular flats 78 of spreader bar 70. Securement pins 82 further incorporate a spring bale 84 which is biased onto pins 82 in a known and customary manner for creating a loop therewith and selectively preventing pins 82 from falling out of holes 80. As can now be appreciated, each of the hook members 48 of the hitch assembly are selectively detachably attached to the lift arms 22 in a positive substantially strong and economical manner.

Figure 3:
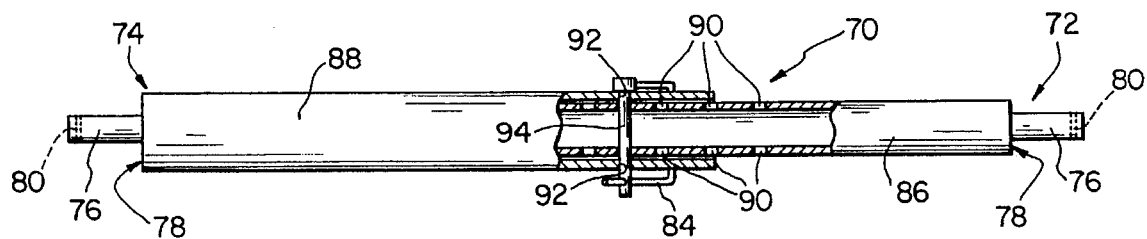
FIG. 3 is a top plan view of a spreader bar according to the present invention and further showing a cut-away portion showing a mechanism for selectively lengthening and shortening the spreader bar.

For attachment of the hitch apparatus to various different implements, the spreader bar 70 is selectively lengthened and shortened as may be needed. In this regard, spreader bar 70 includes an inner tube 86 telescopically received within an outer tube 88 as shown in FIG. 3. Inner tube 86 is provided with a plurality of aligned holes 90 whereas outer tube 88 is provided with a plurality of aligned holes 92. As inner tube 86 is received in and out of outer tube 88, respective pairs of holes 90 are caused to align with outer tube holes 92. To selectively set the length of the spreader bar 70, a spreader bar securement pin 94 is placed through aligned holes 92 and 90 as, for example, shown in FIG. 3. A spring bale 96 may also be used in conjunction with this pin 94 for retaining the same within said respective holes 90 and 92. As can also be appreciated, this preferred spreader bar is elongated and shortened to discreet lengths, however, it is contemplated that other types of spreader bars such as where the inner tube 86 is threadingly received within a threaded bore of tube 88 can be used for an infinite number of lengths.

Referring again now more specifically to FIGS. 4 and 5, at the upper end of neck portion 56 there is pivotally connected a safety arm 98 via pivot pin 100. As shown in FIG. 5, safety arm 98 is pivotable in a first position as shown in solid lines over mouth 50 of hook member 48 and, also, in a second position generally vertically upwardly as shown in dashed lines. A tension spring member 102 is provided and extends between ear 104 and handle 106. Ear 104 is shown attached to flat plate 108 but could just as easily instead be connected to upright walls 64 or flat valley section 62. Safety arm 98, as shown, is made of a single piece of steel bent in a generally U-shape for creating an end stop surface 110. It is contemplated, however, that other means of construction can be implemented, such as casting, for constructing safety arm 98. Accordingly, by merely grasping handle 106, the operator can easily selectively rotate safety arm 98 about pivot pin 100 and against the biasing force of spring 102 for placement in either the loading/unloading upright or safety downward positions. Nevertheless, spring member 102 will act to bias the safety arm 98 and retain it either in the first position over mouth 50 or in the second position generally vertically upwardly as shown in dashed lines in FIG. 5.

As can now be appreciated, in operation, after the hook members 48 are attached to the lift arm ends 26, the operator first determines the desired length between respective hook members 48 to accommodate the implement 42 and lengthens or shortens the spreader bar 70 as needed to the desired length. Thereafter, the safety arms 98 are raised as shown in FIG. 1 and the operator backs the tractor to the implement. The lift arms 22 are lowered placing hook members 48 under implement attachment shafts 52 and, once in position, the lift arms 22 are raised thereby hooking and placing the implement attachment shafts 52 through mouth 50 of hook members 48 so that the implement attachment shafts 52 rest on curvilinear surface 58 of hook members 48. Thereafter, the operator merely rotates the safety arms 98 by grasping handles 106 and rotating the same against the biasing force of spring 102 placing the safety arms 98 over mouth 50 of hook member 48 and thereby preventing the implement attachment shafts 52 from exiting therefrom. Finally, if needed, the operator can attach the upper support arm 38 to the implement in a known and customary manner.

Figure 7:
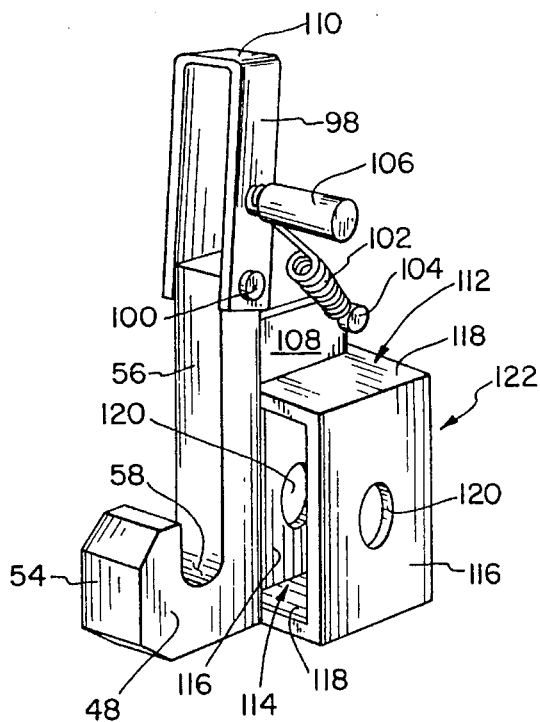

In a second embodiment, as shown in FIG. 7, the hitch apparatus is provided with a square sleeve portion 112 forming a longitudinal channel 114 wherein the tractor lift arm ends 26 are received. The square sleeve 112 includes a pair of aligned upright walls 116 connected between smaller horizontally disposed walls 118. Square sleeve 112 could, for example, be made by cutting pieces of square tube stock at the desired longitudinal length. A pair of axially aligned holes 120 are provided on each of aligned walls 116. Holes 120 are located on aligned walls 116 so that when the lift arm ends 26 are received within channel 114, holes 120 are also coaxially aligned with the tractor lift arm bores 24. As with the embodiment of FIGS. 1–5, the mounting pegs 76 of spreader bar 70 are selectively received through respective coaxially aligned wall holes 120 and tractor lift arm bores 24 and, further, a securement pin 94 is again used for retaining the square sleeves 112 upon mounting pegs 76 and against annular flat 78 of spreader bar 70. It is noted that in this embodiment the lift arm ends 26 are sandwiched between aligned upright walls 116 in the horizontal direction and between aligned horizontal walls 118 in the vertical direction. In this embodiment, however, the placement of the hitch apparatus on the lift arm requires the insertion of the lift arms into the channel 114 from the back end 122 thereof whereas in the embodiment of FIGS. 1–5, the hook members can be placed on the lift arms from the side thereof.

Figure 6:
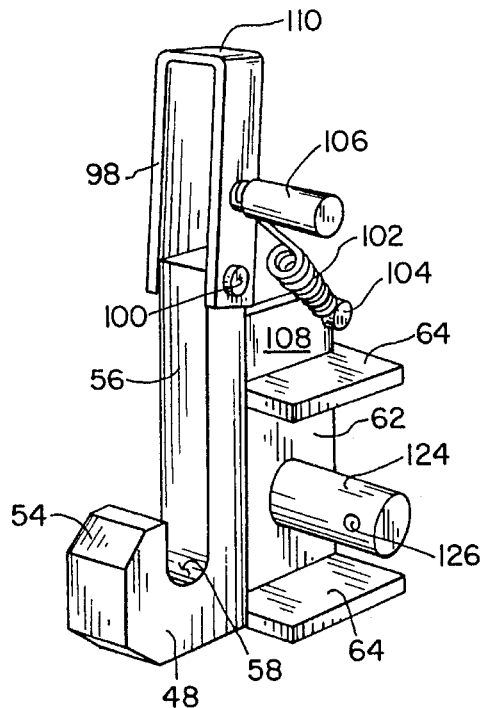
FIG. 6 is a perspective view of a second embodiment of a hitch apparatus according to the present invention; and, FIG. 7 is a perspective view of yet another embodiment of a hitch apparatus according to the present invention.

In yet another embodiment, as shown in FIG. 6, a spreader bar is not used. Instead, mounting pegs 124 are provided and are attached and extend from the valley flat sections 62. Mounting pegs 124 are also provided with holes 126 which serve the same function as holes 80 of spreader bar 70. In this embodiment, the hook members 48 are attached to the lift arm ends by merely sliding mounting peg 124 into bores 24 of lift arms 22 and causing the lift arm ends to be received within channels 66 whereat the lift arms are against valley flat sections 62 and inbetween upright walls 64. A securement pin 94 is again used to sandwich the lift arm between the pin 94 and the valley flat section 62. As can be appreciated, this embodiment can be used and may be desired where the distance between the two hook members 48 is not critical or, for some other reason, need not be set to a preselected distance.

While the invention has been described as having specific embodiments, it will be understood that it is capable of further modifications. This application is, therefore, intended to cover any variations, uses, or adaptations of the invention following the general principles thereof and including such departures from the present disclosure as come within known or customary practice in the art to which this invention pertains and fall within the limits of the appended claims.

What is claimed is:

1. A hitch apparatus for use with a pair of tractor lift arms for selectively detachably attaching implements thereto, said hitch apparatus comprising:

a pair of hook members, each of said hook members having a mouth for receiving an implement attachment shaft;

wherein each of said hook members include attachment means for selectively detachably attaching each of said hook members to one of the tractor lift arms;

wherein each of said attachment means includes a U-shaped portion forming a longitudinal channel, one of each said tractor lift arms extending into one of each said attachment means longitudinal channels;

wherein said U-shaped portions comprise a valley flat section and a pair of upright walls extending away from said valley flat section, said respective tractor lift arms selectively being received between said pair of upright walls; and, wherein said tractor lift arms are provided with a bore and a mounting peg is provided and extends from each of said valley flat sections, said mounting peg received through said tractor lift arm bores when said lift arms are received in said channel and between said upright walls.

2. The hitch apparatus of claim 1 wherein a hole is provided in each of said mounting pegs and, further comprising securement pins selectively received in said mounting peg holes, whereby said tractor lift arms are securely retained in said channels between said upright walls.

3. The hitch apparatus of claim 2 further comprising a safety arm pivotally attached to said hitch apparatus and being selectively pivotable in one position over said hook member mouth and in a second position away from said hook member mouth, whereby when said safety arm is in said first position the implement attachment shafts received in said hook are prevented from exiting.

4. The hitch apparatus of claim 3 further comprising spring means connected between said safety arm and said hitch apparatus for biasing said safety arm toward either said first or said second position.

5. The hitch apparatus of claim 1 further comprising a safety arm pivotally attached to said hitch apparatus and being selectively pivotable in one position over said hook member mouth and in a second position away from said hook member mouth, whereby when said safety arm is in said first position the implement attachment shafts received in said hook are prevented from exiting.

6. The hitch apparatus of claim 1 further comprising a spreader bar extending between and selectively attachable to each of said hitch apparatus and said tractor lift arms, whereby said hitch apparatus and said tractor lift arms are retained apart from one another at a desired distance.

7. The hitch apparatus of claim 6 wherein said spreader bar includes elongation means for selectively increasing and decreasing the length of the spreader bar and the distance between said respective hitch apparatus and said tractor lift arms.

8. A hitch apparatus for use with a pair of tractor lift arms for selectively detachably attaching implements thereto, said hitch apparatus comprising:

a pair of hook members, each of said hook members having a mouth for receiving an implement attachment shaft;

wherein each of said hook members include attachment means for selectively detachably attaching each of said hook members to one of the tractor lift arms;

a safety arm pivotally attached to said hitch apparatus and being selectively pivotable in one position over said hook member mouth and in a second position away from said hook member mouth, whereby when said safety arm is in said first position the implement attachment shafts received in said hook are prevented from exiting; and, spring means connected between said safety arm and said hitch apparatus for biasing said safety arm toward either said first or said second position.

9. The hitch apparatus of claim 8 further comprising a spreader bar extending between and selectively attachable to each of said hitch apparatus and said, tractor lift arms, whereby said hitch apparatus and said tractor lift arms are retained apart from one another at a desired distance.

10. The hitch apparatus of claim 9 wherein said spreader bar includes elongation means for selectively increasing and decreasing the length of the spreader bar and the distance between said respective hitch apparatus and said tractor lift arms.

11. A hitch apparatus for use with a pair of tractor lift arms for selectively detachably attaching implements thereto, said hitch apparatus comprising:

a pair of hook members, each of said hook members having a mouth for receiving an implement attachment shaft;

wherein each of said hook members include attachment means for selectively detachably attaching each of said hook members to one of the tractor lift arms;

wherein each of said attachment means includes a U-shaped portion forming a longitudinal channel, one of each said tractor lift arms extending into one of each said attachment means longitudinal channels;

wherein said U-shaped portions comprise a valley flat section and a pair of upright walls extending away from said valley flat section, said respective tractor lift arms selectively being received between said pair of upright walls;

a spreader bar extending between and selectively attachable to each of said hitch apparatus and said tractor lift arms, whereby said hitch apparatus and said tractor lift arms are retained apart from one another at a desired distance; and, wherein said tractor lift arms are each provided with a bore and corresponding holes are provided in each of said valley flat sections, said lift arm bores being aligned with respective said valley flat section holes when said hitch apparatus are placed on said tractor lift arms, and further wherein said spreader bar is provided with a mounting peg at a spreader bar first end and a second mounting peg at a spreader bar second end, said mounting pegs selectively received through said respective aligned lift arm bores and valley flat section holes, whereby said spreader bar and each of said hitch apparatus are retained on said respective tractor lift arms.

12. The hitch apparatus of claim 11 wherein a hole is provided in each of said spreader bar mounting pegs and, further comprising securement pins selectively received in said mounting peg holes, whereby said tractor lift arms are securely retained in said channel between said upright walls.

13. The hitch apparatus of claim 12 further comprising a safety arm pivotally attached to said hitch apparatus and being selectively pivotable in one position over said hook member mouth and in a second position away from said hook member mouth, whereby when said safety arm is in said first position the implement attachment shafts received in said hook are prevented from exiting.

14. The hitch apparatus of claim 13 further comprising spring means connected between said safety arm and said hitch apparatus for biasing said safety arm toward either said first or said second position.

15. The hitch apparatus of claim 11 further comprising a safety arm pivotally attached to said hitch apparatus and being selectively pivotable in one position over said hook member mouth and in a second position away from said hook member mouth, whereby when said safety arm is in said first position the implement attachment shafts received in said hook are prevented from exiting.

16. The hitch apparatus of claim 15 further comprising spring means connected between said safety arm and said hitch apparatus for biasing said safety arm toward either said first or said second position.

17. The hitch apparatus of claim 11 wherein said spreader bar includes elongation means for selectively increasing and decreasing the length of the spreader bar and the distance between said respective hitch apparatus and tractor lift arms.

18. A hitch apparatus for use with a pair of tractor lift arms for selectively detachably attaching implements thereto, said hitch apparatus comprising:

a pair of hook members, each of said hook members having a mouth for receiving an implement attachment shaft;

wherein each of said hook members include attachment means for selectively detachably attaching each of said hook members to one of the tractor lift arms;

wherein said attachment means includes a square sleeve forming a longitudinal square channel, said tractor lift arms extending into said square channel;

a spreader bar extending between and selectively attachable to each of said hitch apparatus and said tractor lift arms, whereby said hitch apparatus and said tractor lift arms are retained apart from one another at a desired distance; and, wherein each of said square sleeves includes a pair of aligned walls and each of said aligned walls are provided with axially aligned holes, and further wherein each of said tractor lift arms are provided with a bore, said tractor lift arm bores being coaxially aligned with said wall holes when said tractor lift arms are received in said channel, and further wherein said spreader bar is provided with a mounting peg at a spreader bar first end and a second mounting peg at a spreader bar second end, said mounting pegs selectively received through respective coaxially aligned wall holes and tractor lift arm bores.

19. The hitch apparatus of claim 18 further comprising a safety arm pivotally attached to said hitch apparatus and being selectively pivotable in one position over said hook member mouth and in a second position away from said hook member mouth, whereby when said safety arm is in said first position the implement attachment shafts received in said hook are prevented from exiting.

20. The hitch apparatus of claim 19 further comprising spring means connected between said safety arm and said hitch apparatus for biasing said safety arm toward either said first or said second position.

* * * * *